US010324351B2

(12) United States Patent
Kim et al.

(10) Patent No.: US 10,324,351 B2
(45) Date of Patent: Jun. 18, 2019

(54) ELECTROCHEMICAL MIRROR

(71) Applicant: SAMSUNG ELECTRONICS CO., LTD., Suwon-si (KR)

(72) Inventors: Young Soo Kim, Suwon-si (KR); Ki Hyung Kang, Suwon-si (KR); Tae Soon Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 15/716,779

(22) Filed: Sep. 27, 2017

(65) Prior Publication Data

US 2018/0088428 A1 Mar. 29, 2018

(30) Foreign Application Priority Data

Sep. 27, 2016 (KR) .......................... 10-2016-0124029

(51) Int. Cl.
| | | |
|---|---|---|
| *G02F 1/15* | (2019.01) | |
| *G02F 1/155* | (2006.01) | |
| *G02F 1/157* | (2006.01) | |
| *G02F 1/1506* | (2019.01) | |
| *G02F 1/1523* | (2019.01) | |

(52) U.S. Cl.
CPC ............ *G02F 1/1506* (2013.01); *G02F 1/155* (2013.01); *G02F 1/157* (2013.01); *G02F 1/1525* (2013.01); *G02F 2001/164* (2019.01)

(58) Field of Classification Search
CPC ... G02F 1/00; G02F 1/061; G02F 1/15; G02F 1/1506; G02F 1/1525; G02F 1/155; G02F 1/157; G02F 1/163; G02F 1/19; G02F 2001/1502; G02F 2001/164; G09G 3/38; C07D 333/06; C07C 309/28; C07C 309/64; C07C 309/71

USPC .................................. 359/265–275; 345/105
See application file for complete search history.

(56) References Cited

U.S. PATENT DOCUMENTS

| | | | | |
|---|---|---|---|---|
| 5,864,420 A | * | 1/1999 | Udaka | ................... G02F 1/1506 359/270 |
| 6,256,135 B1 | * | 7/2001 | Tench | ................... G02F 1/1506 359/265 |
| 8,437,067 B2 | * | 5/2013 | Hattori | ................... G02F 1/1506 252/582 |
| 9,383,619 B2 | * | 7/2016 | Kim | ........................ G02F 1/155 |
| 2009/0280414 A1 | | 11/2009 | Koh et al. | |

(Continued)

FOREIGN PATENT DOCUMENTS

KR  10-1475628 B1  12/2014

OTHER PUBLICATIONS

International Search Report (PCT/ISA/210) issued by the International Searching Authority in corresponding International Application No. PCT/KR2017/010397, dated Jan. 24, 2018.

*Primary Examiner* — Loha Ben
(74) *Attorney, Agent, or Firm* — Sughrue Mion, PLLC

(57) ABSTRACT

An electrochemical mirror is provided. The electrochemical mirror includes a first transparent electrode; a second transparent electrode spaced apart from the first transparent electrode; and an electrolyte layer formed of an electrolyte, and disposed between the first transparent electrode and the second transparent electrode, wherein the electrolyte includes an electro-depositable metal ion; a halogenated ionic liquid; and at least one additive selected from the group consisting of a compound having a sulfonate functional group and derivatives thereof.

20 Claims, 10 Drawing Sheets

(56) References Cited

U.S. PATENT DOCUMENTS

| | | |
|---|---|---|
| 2010/0039692 A1 | 2/2010 | Yamada et al. |
| 2014/0065512 A1 | 3/2014 | Kwon et al. |
| 2014/0293508 A1 | 10/2014 | Jang et al. |
| 2015/0146276 A1 | 5/2015 | Kim et al. |
| 2018/0088362 A1* | 3/2018 | Kim .................. G02F 1/061 |

* cited by examiner

ELECTROCHEMICAL MIRROR

CROSS-REFERENCE TO RELATED APPLICATION

This application claims priority from Korean Patent Application No. 10-2016-0124029, filed on Sep. 27, 2016 in the Korean Intellectual Property Office, the disclosure of which is incorporated herein by reference in its entirety.

BACKGROUND

1. Technical Field

Example embodiments of the present disclosure relate to an electrochemical mirror, and more particularly, to an electrochemical mirror which is arranged to be electrochemically switchable.

2. Description of the Related Art

Switchable mirror displays capable of controlling reflection and transparency by external stimulus are being studied.

A switchable mirror may be adjusted for reflection and transparency by electrical stimulation, optical stimulation, or thermal stimulation. Among the methods of electrical stimulation, there are those that can be classified as solid electrolyte methods such as liquid crystal and electro-chromatography methods, and liquid electrolyte methods.

A solid electrolyte method is a method of artificially controlling reflection/transmission by applying a relatively high voltage, which is relatively expensive and requires complicated processes including lamination processes.

On the other hand, a liquid electrolyte method utilizes the electrochemical redox reaction of metal ions. A liquid electrolyte method may provide for reversible mirroring (reduction reaction) and transparency (oxidation reaction), which is advantageous in that a switching mirror can be obtained by utilizing a relatively simple process.

On the other hand, a metal deposition material formed from a liquid electrolyte may exhibit low stability as a result of chemical dissolution at the electrolyte-metal layer interface, low lifetime as a result of high voltage driving, and cracks in a uniformly deposited mirror layer.

SUMMARY

Example embodiments provide an electrochemical mirror with excellent electrochemical stability and memory properties by controlling the type and content of anionic liquid and an additive contained in an electrolyte of the electrochemical mirror.

According to an aspect of an example embodiment, there is provided an electrochemical mirror including a first transparent electrode; a second transparent electrode spaced apart from the first transparent electrode; and an electrolyte layer including an electrolyte, and disposed between the first transparent electrode and the second transparent electrode, wherein the electrolyte includes an electro-depositable metal ion; a halogenated ionic liquid, and at least one additive selected from the group consisting of a compound having a sulfonate functional group and derivatives thereof.

The halogenated ionic liquid may include at least one of a halogenated ionic liquid selected from the group consisting of a pyrrolidinium-based ionic liquid, a pyridinium-based ionic liquid, a piperidinium-based ionic liquid and an imidazolium-based ionic liquid.

The electrochemical mirror may further include a carbonate additive.

The carbonate additive may include at least one selected from the group consisting of a vinylene carbonate (VC), a vinylethylene carbonate (VEC), a fluoro-ethylene carbonate (FEC) and a carbonate additive in which at least one hydrogen atom contained in the carbonate additive is substituted with a fluorine substituent.

The compound having a sulfonate functional group may be in at least one of a cyclic form or a linear form.

The sulfonate compound in cyclic form can be represented by the following constitutional formula 1:

[Constitutional formula 1]

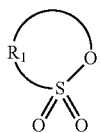

In constitutional formula 1, the $R_1$ group is hydrogen, an alkyl group containing 1 to 10 carbon atoms, an alkene group, or an alkyne group.

One of the hydrogen atoms contained in the alkyl group, the alkene group or the alkyne group may be substituted with the sulfonate functional group.

The constitutional formula 1 may contain at least one of the $R_1$ group.

The constitutional formula 1 may include an ether group in at least one of the rings in the constitutional formula 1 and the $R_1$ group.

The sulfonate compound may include a multiple bond between carbon molecules contained in the sulfonate compound.

The sulfonate compound in linear form can be represented by the following constitutional formula 2:

[Constitutional formula 2]

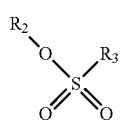

In constitutional formula 2, the $R_2$ and $R_3$ groups are hydrogen, an alkyl group containing 1 to 10 carbon atoms, an alkene group or an alkyne group.

The electro-depositable metal ion may include at least one selected from the group consisting of silver (Ag), gold (Au), magnesium (Mg), nickel (Ni), bismuth (Bi), chromium (Cr), aluminum (Al), copper (Cu) and calcium (Ca).

When a voltage is applied to the first and second transparent electrodes, the electro-depositable ion may be reduced to form an electrochemical mirror layer on a surface of one of the first and second transparent electrodes.

The electrolyte may include at least one selected from the group consisting of ammonium bromide-based materials such as tetra-n-butylammonium bromide (TBABr) and tetraethylammonium bromide (TEABr), a halogenated material containing a halogenated anion and forming an ionic salt with the halogenated anion, lithium bromide (LiBr) and tetra-n-butylammonium perchlorate (TBAP).

The electrolyte may include at least one selected from the group consisting of water, dimethyl sulfoxide (DMSO), N-methyl-2-pyrrolidone (NMP), acetonitrile (AN), ethylene glycol (EG), gamma-butyrolactone (GBL), dimethyl formamide (DMF), glyme-based solvents, ether-based solvents, linear or cyclic carbonate-based solvents and mixtures thereof.

The electrolyte may further include a polymer provided to improve the viscosity and stability of the electrolyte. The polymer may include at least one selected from the group consisting of polyvinyl butyral (PVB), cyano resin, polyvinylidene fluoride (PVDF), polyvinylidene-hexafluoropropylene (PVDF-HFP) and mixtures thereof.

The first and second transparent electrodes may be provided with at least one substrate selected from the group consisting of a glass substrate, a rigid substrate, a polyethylene terephthalate (PET) substrate, and a flexible substrate.

BRIEF DESCRIPTION OF THE DRAWINGS

The above and/or other aspects will become apparent and more readily appreciated from the following description of example embodiments, taken in conjunction with the accompanying drawings of which.

DETAILED DESCRIPTION

Figure 1:
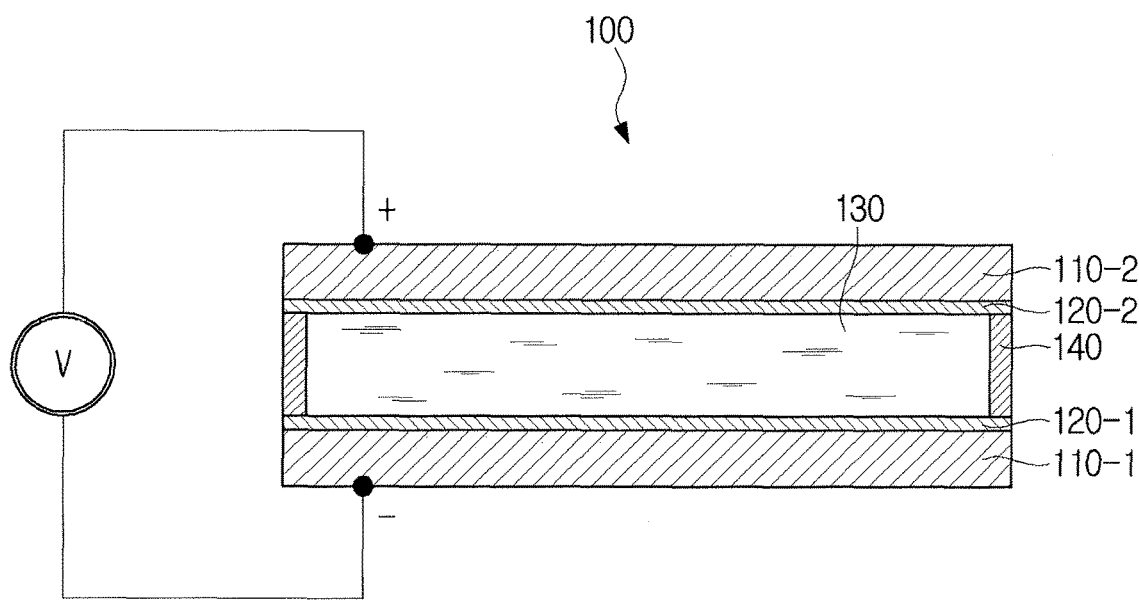
FIG. 1 is a diagram showing the structure of an electrochemical mirror device according to an example embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art via the present disclosure. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Example embodiments will now be described more fully with reference to the accompanying drawings. The example embodiments may, however, be used in many different forms and should not be construed as being limited to the embodiments set forth herein. The embodiments discussed herein are provided so that this disclosure will be thorough and complete and will fully convey the example embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another.

As used herein, the singular forms "a," "an," and "the" are intended to include the plural forms as well, unless the context clearly indicates otherwise.

Example embodiments relate to an electrochemical mirror with high switching speed, electrochemical stability (anti-peeling effect), and bi-stability (memory effect).

The electrochemical mirror device according to one or more example embodiments may include an electrolyte layer interposed between transparent electrodes. Such an electrochemical mirror device could operate in a light transmission mode and a light reflection mode depending on whether a voltage is applied or not. This is caused by the redox reaction of the electrolyte, generated depending on whether voltage is applied.

Example embodiments an electrochemical mirror device having excellent electrochemical stability and cycle characteristics and having a memory property by controlling the kind and content of the halogenic ionic liquid contained in an electrolyte, and the kind and content of an additive.

The transmittance of an electrochemical mirror may be controlled by controlling the voltage applied to an electrode therein. Accordingly, the present disclosure may be applied to a device such as a smart window, so as to control the internal temperature of a building by controlling the amount of sunlight entering through the window. The possible uses of the electrochemical mirror according to the example embodiments are not limited thereto and the electrochemical mirror may be applied within various fields in ways that may be easily understood by a person skilled in the art.

Hereinafter, example embodiments will be described with reference to the accompanying drawings.

Figure 2:
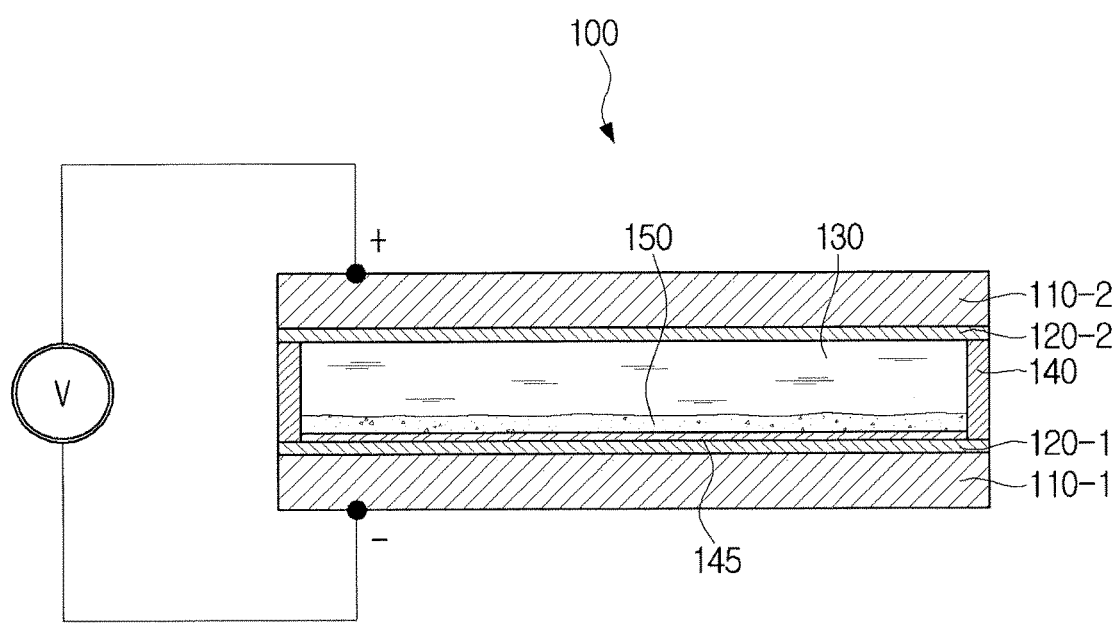
FIG. 2 is a view showing an electrochemical mirror when a voltage is applied to an electrochemical device.

FIGS. 1 and 2 are a diagram and a view, respectively, showing the structure of an electrochemical mirror 100 according to an example embodiment. FIGS. 1 and 2 illustrate an exemplary structure and function of an electrochemical mirror according to the example embodiment, and the dimensions illustrated in the figures, including the thickness of the thin film therein, are exemplary only and may be exaggerated for clarity.

Referring to FIGS. 1 and 2, the electrochemical mirror 100 according to this example embodiment has a structure in which an electrolyte is disposed between transparent electrodes 120-1 and 120-2 facing each other. Specifically, the electrochemical mirror 100 includes a first substrate 110-1, a second substrate 110-2 spaced apart from the first substrate 110-1, a first transparent electrode 120-1 disposed on the first substrate 110-1, a second transparent electrode 120-2 disposed on the second substrate 110-2, and an electrolyte layer 130 disposed between the first transparent electrode 120-1 and the second transparent electrode 120-2.

The first substrate 110-1 and the second substrate 110-2 may be transparent substrates. For example, the first substrate 110-1 and the second substrate 110-2 may be at least one substrate selected from the group consisting of a glass substrate, a rigid substrate, a polyethylene terephthalate (PET) substrate, and a flexible substrate.

The first transparent electrode 120-1 and the second transparent electrode 120-2 are transparent electrodes for electrochemical mirrors. Hereinafter, the first transparent electrode 120-1 is defined as a cathode electrode or a working electrode, and the second transparent electrode 120-2 is defined as an anode electrode. It goes without saying that the above definition is for the sake of convenience of explanation, and the first transparent electrode 120-1 may function as an anode electrode and the second transparent electrode 120-2 may function as an cathode electrode in different embodiments and based on the method used to apply voltage.

The first transparent electrode 120-1 and the second transparent electrode 120-2 may be formed from at least one of an Indium Tin oxide (ITO), a Fluorine-doped Tin Oxide (FTO), and an Indium Zinc Oxide (IZO) material. However, the material of the first transparent electrode 120-1 and the second transparent electrode 120-2 is not limited to those described above, and the material may be composed of an organic, inorganic or organic composite material through doping and coating.

In addition, the first transparent electrode 120-1 and the second transparent electrode 120-2 may have a thickness of several hundred nanometers to several hundred micrometers.

However, the types and thicknesses of the first transparent electrode 120-1 and the second transparent electrode 120-2 are not limited thereto.

The electrolyte layer 130 may be provided with an electrolyte. The electrolyte may include an electro-depositable metal salt, a halogenated ionic liquid, a solvent, a polymer, and an additive.

The electro-depositable metal salt includes an electro-depositable metal ion that is involved in the formation of the electrochemical mirror layer, and the halogenated ionic liquid serves to maintain the electrochemical mirror layer formed by the electro-depositable metal ion.

The electro-depositable metal in the electro-depositable metal salt may include a metal component that directly forms a mirror layer and a metal component that serves as a catalyst for promoting nucleation and growth of the metal component.

Examples of electro-depositable metal ions may include silver (Ag), gold (Au), magnesium (Mg), nickel (Ni), bismuth (Bi), chromium (Cr), aluminum (Al), copper (Cu), calcium (Ca) and strontium (Sr), but examples of usable metal ions are not limited thereto.

Metals such as copper (Cu), calcium (Ca) and strontium (Sr) may function as a catalyst for promoting the nucleation and growth of metals such as silver (Ag), gold (Au), magnesium (Mg), nickel (Ni), bismuth (Bi), chromium (Cr) and aluminum (Al), and could form an electrochemical mirror layer (150 in FIG. 2) with those metals.

Metals such as copper (Cu), calcium (Ca) and strontium (Sr) may be present in an amount of, for example, up to 50 wt % of the amount of other metals, such as silver (Ag), gold (Au), magnesium (Mg), nickel (Ni), bismuth (Bi), chromium (Cr) and aluminum (Al) for the even formation of the electrochemical mirror layer 150 of FIG. 2. However, the content ratios of these metals are not limited to the above-described numerical ranges.

Hereinafter, for convenience of explanation, example embodiments will be described by using as an example an instance in which the electro-depositable metal includes silver (Ag) and copper (Cu). Silver (Ag) and copper (Cu) may be provided as salts in a dissolved form in the electrolyte, such salts being formed by the metal and anions that may be, for example, nitrates, halides, lactates, sulfides, permanganates and perhalates. However, the above-mentioned salts are merely examples of the forms in which silver and copper may be provided, and the metal salts include all metal salts within the contemplation of those of ordinary skill in the art.

Silver (Ag) is a material that participates in the formation of an electrochemical mirror layer. When a voltage is applied to the first and second transparent electrodes 120-1 and 120-2 of the electrochemical mirror 100, the silver ions (Ag+) included in the electrolyte are reduced at the surface of the first transparent electrode 120-1 so as to form the electrochemical mirror layer 150. When the electrochemical mirror layer 150 is formed on the electrode surface, the electrochemical mirror 100 may operate in a mirror mode (opaque mode), which will be discussed in more detail below.

Copper (Cu) acts as a catalyst for the nucleation and growth of silver ions (Ag+), and may be not included in the electrolyte depending on the amount present of the compound having a sulfonate functional group, which will be discussed in more detail below.

The halogenated ionic liquid may act to enhance the solubility of the electro-depositable ions contained in the electrolyte as a result of the presence of the anion in the halogenated ionic liquid. In addition, the halogenated ionic liquid may form a complex together with silver (Ag) and copper (Cu) components forming the electrochemical mirror layer 150, and thus the electrochemical mirror layer 150 can therefore be maintained even in a state of open circuit voltage (OCV).

The halogenated ionic liquid may include at least one selected from the group consisting of a pyrrolidinium-based ionic liquid, a pyridinium ionic liquid, a piperidinium-based ionic liquid, and an imidazolium-based ionic liquid, and a fluorinated (F) material, a brominated (Br) material, a chlorinated (Cl) material, an iodide (I) material, or the like could be used as the halogen material or the pseudo-halogenated material.

The halogen material or the pseudo-halogenated material may include ammonium bromide-based materials such as tetra-n-butylammonium bromide (TBABr) and tetraethylammonium bromide (TEABr), a halogenated material containing a halogenated anion such as fluoride (F—), chloride (Cl—), bromide (Br—) and iodide (I—), which forms an ionic salt with a halogenated anion, lithium bromide (LiBr), tetra-n-butylammonium perchlorate (TBAP), or the like. However, the halides useful in such embodiments is not limited to the above-mentioned examples, and include modifications and compositions easily conceived by a person skilled in the art.

The solvent may dissolve electro-depositable metal salts and halogenated ionic liquids. The solvent may include at least one selected from the group consisting of water, dimethyl sulfoxide (DMSO), N-methyl-2-pyrrolidone (NMP), acetonitrile (AN), ethylene glycol (EG), gamma-butyrolactone (GBL), dimethyl formamide (DMF), glyme-based solvents, ether-based solvents, linear or cyclic carbonate-based solvents and mixtures thereof.

The glyme-based solvent may include at least one selected from the group consisting of 1,2-dimethoxyethane, dimethyl ether (DME), diethylethylene glycol dimethyl ether (DEGDME), triethylene glycol dimethyl ether (TriEGDME), tetraethylene glycol methyl ether) and mixtures thereof. However, the types of glyme-based solvents that may be used are not limited to the above-mentioned examples.

The ether solvent is a solvent in which an alkylene group, a cycloalkylene group or an arylene group is connected to an ether group, specifically, and may include at least one selected from the group consisting of diethyl glycol dimethyl ether, triethylene glycol dimethyl ether, tetraethylene glycol dimethyl ether, and mixtures thereof, but is not limited to the above-mentioned examples.

Carbonate-based solvents may include at least one selected from the group consisting of ethylene carbonate (EC), propylene carbonate (PC), dimethyl carbonate (DMC), diethyl carbonate (DEC) and ethyl-methyl carbonate (EMC), but is not limited to the above-mentioned examples.

Polymers may be added to the solvent to improve the viscosity and stability of the electrolyte, and additives may be further added to improve the switching speed and bi-stability.

The polymer may include at least one selected from the group consisting of polyvinyl butyral (PVB), cyano resin, polyvinylidene fluoride (PVDF), polyvinylidene-hexafluoropropylene (PVDF-HFP), and mixtures thereof. The polymer may interact with at least one of the salt and solvent described above. These interactions may be intermolecular forces, van der Waals forces, electrostatic interactions, or a combination thereof.

The additive is a substance added to the electrolyte for the purpose of improving the switching speed and bi-stability of the electrochemical mirror 100. As the kind of the additive, a compound having a sulfonate functional group or a derivative compound containing a sulfonate functional group may be used, and a carbonate-based additive may be used according to an example embodiment.

Hereinafter, a compound having a sulfonate functional group and a derivative compound containing the sulfonate functional group will be referred to as sulfonate compounds.

The additive may interact with at least one of the salt and the solvent, just as the polymer described above may do so. These interactions may be intermolecular forces, van der Waals forces, electrostatic interactions, or a combination thereof.

The sulfonate compound may be present in the range of 0.1 to 10 wt %, preferably 0.1 to 5 wt %, and more preferably 0.1 to 3 wt % based on the total weight of the electrolyte.

When the sulfonate compound is contained in an amount of less than 0.1 wt % based on the total weight of the electrolyte, it may be difficult to achieve the object of improving the switching speed of the electrochemical mirror 100. On the other hand, when the content of the sulfonate compound is too high, the electrolyte may react with the blocking wall 140 that forms the cell, thereby causing a problem such as the destruction of the cell structure. Accordingly, it is preferable to add the sulfonate compound in an appropriate amount depending on the desired performance of the electrochemical mirror 100.

A sulfonate compound having at least one of an annular form and a linear form may be used.

Specifically, the cyclic sulfonate compound may be a propane sultone compound or a butane sultone compound. A 1,3-propanesultone is an example of a propane sultone compound, and a 1,4-butanesultone is an example of a butane sultone compound. However, the propane sultone compound and the butane sultone compound are not limited to these, and may include a range of modifications readily conceived by a person skilled in the art.

A sulfonate compound in a cyclic form may be represented by the following [constitutional formula 1].

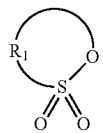

[Constitutional formula 1]

In the constitutional formula 1, the $R_1$ group is hydrogen, an alkyl group having from 1 to 10 carbon atoms, an alkene group or an alkyne group.

Alkyl refers to fully saturated branched or unbranched hydrocarbons. At least one hydrogen atom of the alkyl group having 1 to 10 carbon atoms may be substituted with a sulfonate functional group, a halogen atom, a $C_1$-$C_{10}$ alkyl group substituted with a halogen atom (e.g., $CCF_3$, $CHCF_2$, $CH_2F$, $CCl_3$, and the like), a $C_1$-$C_{10}$ alkoxy, a $C_2$-$C_{10}$ alkoxyalkyl, a hydroxyl group, a nitro group, a cyano group, an amino group, an amidino group, a hydrazine, a hydrazone, a carboxyl group or a salt thereof, a sulfonyl group, a sulfamoyl group, a sulfonic acid group or a salt thereof, a phosphoric acid or a salt thereof, a $C_1$-$C_{10}$ alkyl group, a $C_2$-$C_{10}$ alkenyl group, a $C_2$-$C_{10}$ alkynyl group, a $C_1$-$C_{10}$ heteroalkyl group, a $C_1$-$C_{10}$ aryl group, a $C_6$-$C_{10}$ arylalkyl group, a $C_6$-$C_{10}$ heteroaryl group, a $C_7$-$C_{10}$ heteroarylalkyl group, a $C_6$-$C_{10}$ heteroaryloxy group, a $C_6$-$C_{10}$ heteroaryloxyalkyl group or a $C_6$-$C_{10}$ heteroarylalkyl group.

The halogen atom may be fluorine, bromine, chlorine, iodine, and the like.

Alkenes refer to branched or unbranched hydrocarbons having at least one carbon-carbon double bond. Non-limiting examples of an alkene include vinyl, allyl, butenyl, isopropenyl, isobutenyl, or the like, and at least one hydrogen atom in the alkene may be substituted with the same substituent as discussed above with respect to alkyl groups.

In addition, alkyne refers to branched or unbranched hydrocarbons having at least one carbon-carbon triple bond. Non-limiting examples of alkyne include ethynyl, butynyl, isobutynyl, isopropynyl, and the like.

At least one hydrogen atom in the alkyne may be substituted with the same substituent as the alkyl group described above.

The constitutional formula 1 may contain one or more $R_1$ groups. In other words, one $R_1$ group may be bonded to the carbon ring of the constitutional formula 1, and two or more $R_1$ groups may be included according to a given embodiment.

At least one of the $R_1$ group and the ring of the constitutional formula 1 may contain an ether group. The cyclic form of the sulfonate compound may include multiple bonds between the carbon molecules contained in the sulfonate compound. Specifically, it may include a double bond or a triple bond formed between carbon molecules.

The linear form of the sulfonate compound may be represented by the following [constitutional formula 2].

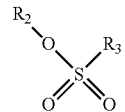

[Constitutional formula 2]

In the constitutional formula 2, the $R_2$ and $R_3$ group are each independently hydrogen, an alkyl group of 1 to 10 carbon atoms, an alkene group or an alkyne group.

At least one hydrogen atom of the alkyl, alkene or alkyne may be substituted with the same substituent as in the alkyl group of the above-mentioned constitutional formula 1.

At least one of the $R_2$ and $R_3$ group may contain an ether group.

A carbonate-based additive may serve to enhance the catalytic function of a sulfonate additive. As the carbonate-based additive, a vinylene carbonate (VC), a vinylethylene carbonate (VEC), a fluoro-ethylene carbonate (FEC) additive and the like may be used. At least one hydrogen atom contained in the additive may be substituted with a fluorine substituent. However, the above-mentioned examples are merely examples of the kind of carbonate-based additive that may be used, and the carbonate-based additive that may be used is not limited to the above-mentioned examples.

The electrochemical mirror 100 may be disposed such that the first substrate 110-1 and the second substrate 110-2 are spaced apart from each other, and may include spacers for maintaining cell spacing, and may further include the blocking wall 140 configured to form a cell. The spacer may be made from an insulating material such as silicon dioxide ($SiO_2$), but the material of the spacer is not limited thereto. The cell formed by the blocking wall 140 may receive an electrolyte. The blocking wall 140 may be made from a material such as an anti-chemical bonding tape, an ultraviolet (UV) or a thermosetting sealant, but the type of the material used for the blocking wall 140 is not limited to the above-mentioned examples.

A structure of the electrochemical mirror 100 according to the present disclosure has been described above. However, the electrochemical mirror 100 may have various structures in addition to the structure shown in FIG. 1. For example, an electrochemical mirror may be provided in the form of a transistor-type switchable electrochemical mirror, and the electrochemical mirror disclosed herein should be understood as including a range of modifications easily conceived by a person skilled in the art.

Hereinafter, referring to FIGS. 1 and 2, a method of switching the electrochemical mirror 100 into a mirror mode (opaque mode) and a transparent mode based on whether a voltage is applied will be described.

FIG. 1 shows a case where no voltage is applied to the electrochemical mirror 100. As shown in FIG. 1, when no voltage is applied to the electrochemical mirror 100, the first transparent electrode 120-1, the second transparent electrode 120-2, and the electrolyte layer 130 may have a high transmittance with respect to the light incident on the electrochemical mirror 100. As a result, the electrochemical mirror 100 operates in a transmission mode.

FIG. 2 is a case where a voltage is applied to the electrochemical mirror 100. As shown in FIG. 2, when a voltage is applied to the electrochemical mirror 100, an electrochemical reaction takes place at the first transparent electrode 120-1, which is a cathode electrode. In other words, silver ions (Ag+) are reduced so as to form an electrochemical mirror layer 150 on the surface of the cathode electrode. Hereinafter, when a voltage is applied to the electrochemical mirror 100, the film formed on the surface of the first transparent electrode 120-1 serving as a cathode electrode is the electrochemical mirror layer 150.

In order to facilitate understanding, the operation of forming the electrochemical mirror layer 150, that is, the operation of switching the electrochemical mirror 100 from the transparent mode to the mirror mode, will be described in detail.

First, when a voltage is applied to the first transparent electrode 120-1 and the second transparent electrode 120-2, the sulfonate compound is reduced on the surface of the first transparent electrode 120-1, which is a cathode electrode, to form the organic layer 145. In this case, when a carbonate-based additive is added to the electrolyte, the carbonate-based additive functions to strengthen the organic layer 145 formed by the sulfonate compound.

Subsequently, when a voltage is applied to the first and second transparent electrodes 120-1 and 120-2, copper ions (Cu2+) are reduced from the surface of the first transparent electrode 120-1, which is a cathode electrode. Copper reduced on the surface of the cathode serves as a catalyst for assisting the growth of silver ions (Ag+) on the surface of the cathode electrode. As the copper grows on the surface of the cathode electrode, the reduction of silver ions (Ag+) is initiated on the surface of the cathode using the grown copper particles as a catalyst.

On the surface of the cathode electrode, silver ions are reduced and grown around the initially reduced silver particles, and as a result, the electrochemical mirror layer 150 is formed and a mirror characteristic is realized. At this time, the halogenated ionic liquid forms an aggregate together with the electrochemical mirror layer 150. As a result, a memory effect is produced even in an OCV state in which the voltage applied to the first and second transparent electrodes 120-1 and 120-2 is cut off.

On the other hand, the operation of switching from the mirror mode to the transparent mode proceeds to the opposite stage to the positive reaction, that is, the electrochemical dissociation reaction proceeds.

Figure 3:
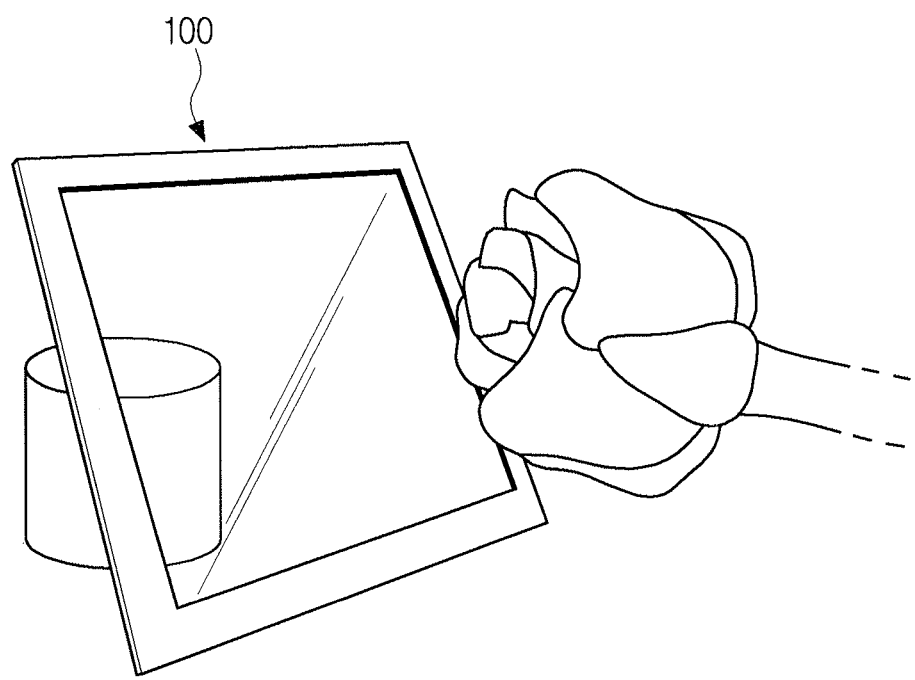
FIG. 3 is a view showing an electrochemical mirror operating in a transparent mode.
Figure 4:
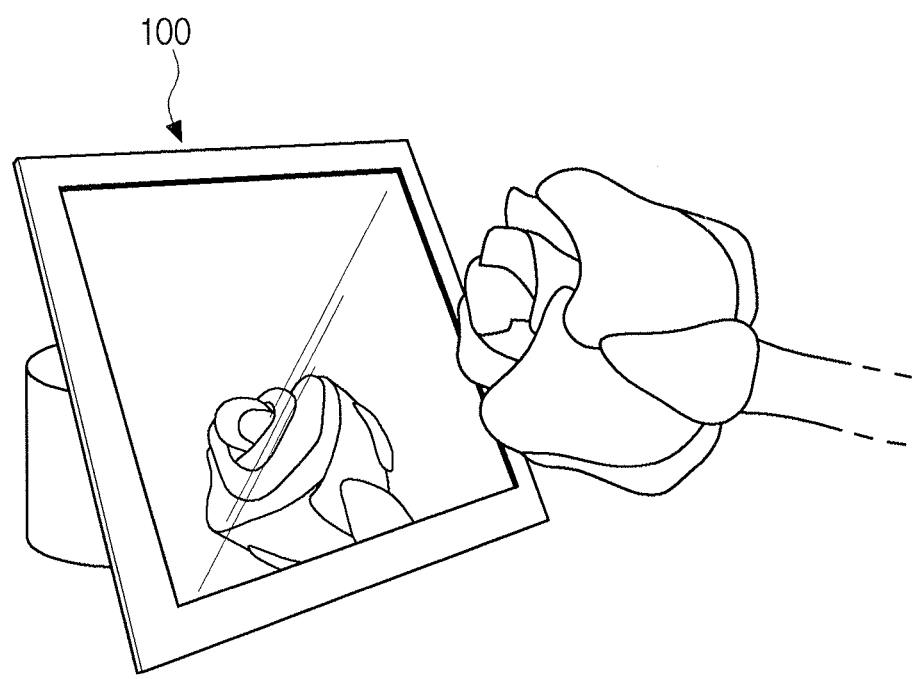
FIG. 4 is a view showing an electrochemical mirror operating in a mirror mode.

FIGS. 3 and 4 show the electrochemical mirror 100 operating in a transparent mode and mirror mode, respectively. FIG. 3 illustrates the electrochemical mirror 100 operating in a transparent mode, and FIG. 4 illustrates the electrochemical mirror 100 operating in a mirror mode.

As shown in FIG. 3, when the electrochemical mirror 100 operates in a transparent mode, it is possible to identify objects disposed on the back surface of the electrochemical mirror 100. On the other hand, when the electrochemical mirror 100 operates in the mirror mode as shown in FIG. 4, the object disposed on the rear surface of the electrochemical mirror 100 is blocked, and the mirror image of the object placed on the front surface can be seen in the electrochemical mirror 100.

Below, Examples and Comparative Examples will be described.

Example 1

10 wt % of cyano resin (grade: CR-S, ShinEtsu Co.) was added to a solution of 50 mM nitric acid silver ($AgNO_3$), 10 mM copper chloride ($CuCl_2$) and 450 mM N-butylmethyl pyrrolidinium bromide (NBMPBr) ionic liquid in a DMSO solvent, and 1 wt % of vinylene carbonate (VC) and 1 wt % of 1,3-propane sultone (PS) were added as an additive.

Example 2

10 wt % of cyano resin (grade: CR-S, ShinEtsu Co.) and 1 wt % of 1,3-propane sultone (PS) were added to a solution of 50 mM nitric acid silver ($AgNO_3$), 10 mM copper chloride ($CuCl_2$) and 450 mM N-butylmethyl pyrrolidinium bromide ionic liquid in a DMSO solvent.

Example 3

10 wt % of cyano resin (grade: CR-S, ShinEtsu Co.) was added to a solution of 50 mM nitric acid silver ($AgNO_3$), 10 mM copper chloride ($CuCl_2$) and 450 mM butylmethylimidazolium bromide (BMIBr) ionic liquid in a DMSO solvent, and 1 wt % of vinylene carbonate (VC) and 1 wt % of 1,3-propane sultone (PS) were added as an additive.

Comparative Example 1

5 wt % of polyvinyl butyral (PVB) was added to a solution of 50 mM nitric acid silver ($AgNO_3$), 10 mM copper chloride ($CuCl_2$) and 250 mM tetrabutylammonium bromide (TBABr) ionic liquid in a DMSO solvent.

Comparative Example 2

10 wt % of cyano resin (grade: CR-S, ShinEtsu Co.) was added to a solution of 50 mM nitric acid silver ($AgNO_3$), 10 mM copper chloride ($CuCl_2$) and 450 mM N-butylmethyl pyrrolidinium bromide ionic liquid in a DMSO solvent.

The components of the electrolyte according to Examples 1-3 and Comparative examples 1-2 are summarized as follows in Table 1.

TABLE 1

|  | Example 1 | Example 2 | Example 3 | Comparative example 1 | Comparative example 2 |
| --- | --- | --- | --- | --- | --- |
| Mirroring metal | Silver ($Ag^+$) | Silver ($Ag^+$) | Silver ($Ag^+$) | Silver ($Ag^+$) | Silver ($Ag^+$) |
| Catalyst | Copper ($Cu^{2+}$) | Copper ($Cu^{2+}$) | Copper ($Cu^{2+}$) | Copper ($Cu^{2+}$) | Copper ($Cu^{2+}$) |
| Halogenated ionic liquid | NBMPBr | NBMPBr | BMIBr | — | NBMPBr |
| Halogenated salt | — | — | — | TBABr | — |
| Solution | DMSO | DMSO | DMSO | DMSO | DMSO |
| Polymer | CR-S | CR-S | CR-S | PVB | CR-S |
| Additive | PS, VC | PS | PS, VC | — | — |

The properties of electrolytes according to Examples 1-3 and Comparative examples 1-2 were measured by the following methods.

Electrochemical Impedance Spectroscopy (EIS)

The interfacial resistance of the cell was measured for electrolytes according to Example 1, Example 3 and Comparative example 1 within the frequency range of 500 mHz to 200 kHz in a −3 V mirroring state.

Switching Speed

For the electrolytes of Example 1, Example 2, Comparative example 1, and Comparative example 2, the transition time from the transparent mode to the mirror mode (hereinafter referred to as the mirroring time) and the time from the mirror mode to the transparent mode (hereinafter referred to as the transparency time) were measured. In order to provide reliability, the mirroring time and the transparency time were measured 5 times or more, and the values excluding the maximum value and the minimum value were obtained as the result values.

Cyclic Voltammogram

The electrochemical redox behavior of the electrolyte according to Example 1 and Comparative example 1 was measured under conditions of 20 mV/sec, −3 V to 1 V, and 100 cycles. For the stabilization of the initial transparent electrode cell, 100 cycle measurement results after 5 redox cycles were plotted.

Charge Density Measurement Experiment

The state of increase of charge density (Q) over time was measured in order to determine the stable driving state of the transparent electrode when a long-time mirroring state was maintained at the reduction potential (−3 V).

Each experimental result will be described in detail with reference to the accompanying drawings.

Figure 5:
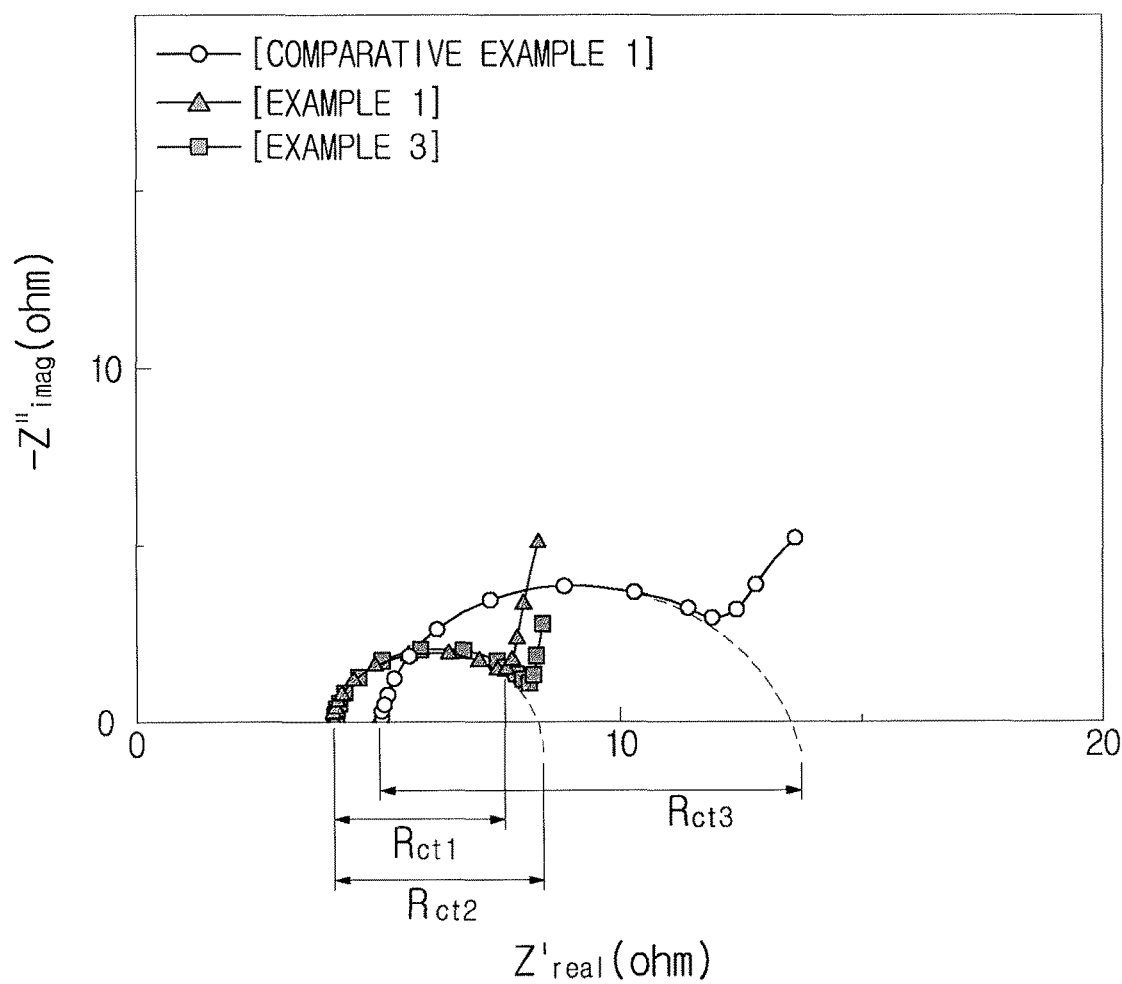
FIG. 5 is a graph showing an electrochemical impedance spectroscopy measurement result.

FIG. 5 is a graph showing electrochemical impedance spectroscopy measurement results. FIG. 5 shows the interfacial resistance of the cell for the electrolyte according to Example 1, Example 3 and Comparative example 1, and only the differences in interfacial resistance were compared. In the graph in FIG. 5, the diameter of the semicircle on the horizontal axis of the graph indicates the interface resistance of the electrolyte.

Experimental results show that the interface resistance Rct1 of the electrolyte according to Example 1 including NBMPBr as an ionic liquid, a 1, 3-propane sultone additive (PS) and vinylene carbonate (VC) as an additive, and the interface resistance Rct2 of the electrolyte according to Example 3 including BMIBr as an ionic liquid, a 1, 3-propane sultone additive (PS) and vinylene carbonate (VC) as an additive have a lower resistance than that of the electrolyte Rct3 according to Comparative example 1 which does not include a halogenated ionic liquid or additive.

In particular, the interface resistance Rct1 of the electrolyte of Example 1 using NBMPBr as an ionic liquid is lower than that of Rct2 of the electrolyte of Example 3 using BMIBr as an ionic liquid. From this, it was confirmed that superior mirror characteristics are realized when NBMPBr is used as an ionic liquid.

Figure 6:
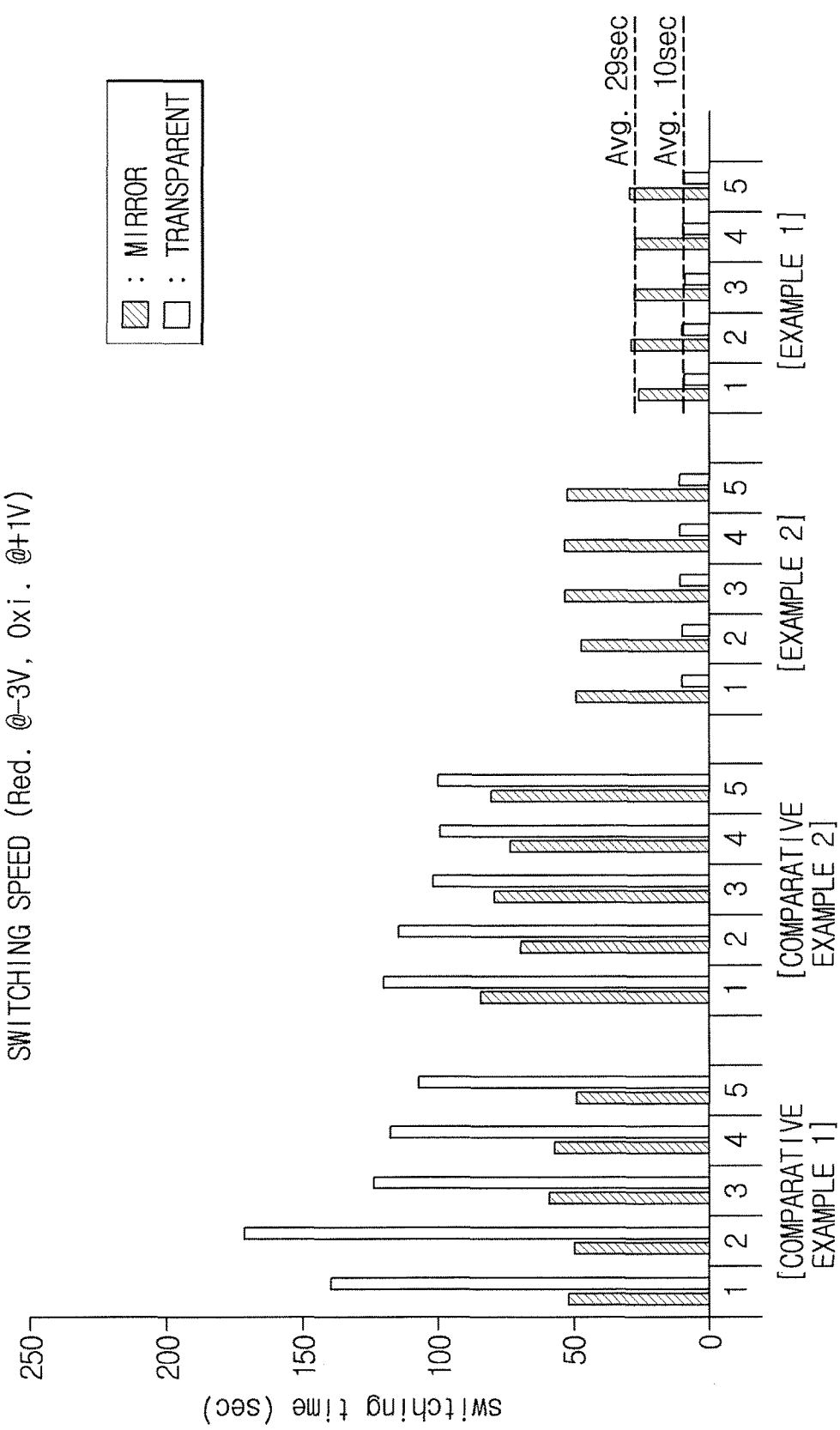
FIG. 6 is a graph showing the switching speed of an electrolyte according to Example 1, Example 2, Comparative Example 1 and Comparative Example 2.

FIG. 6 shows a switching speed graph of an electrolyte according to Example 1, Example 2, Comparative example 1, and Comparative example 2. The horizontal axis in FIG. 6 represents the electrolyte type according to Example 1, Example 2, Comparative example 1 and Comparative example 2, and the vertical axis represents the switching time. Here, the switching time means the time it took from when an object disposed on the backside of the electrochemical mirror 100 completely vanished (mirroring) via a reduction reaction discussed above to when it returns to the initial state (transparency) via oxidation reaction after mirroring.

By comparing the magnitudes of the mirroring speed and the transparency speed of the electrolyte according to Example 1 and Example 2 and the electrolyte according to Comparative example 1 and Comparative example 2, it can be seen that the TBABr-based electrolyte of Comparative example 1, which did not include the halogenated ionic liquid according to the present disclosure, exhibited the slowest rate of transparency. Also, it can be seen that the mirroring speed is slower than that of Example 1 and Example 2.

Also, in the case of the electrolyte according to Comparative example 2 in which NBMPBr was used as the halogenated ionic liquid but no additive was used, it can be seen that both the transparency speed and the mirroring speed were slower as compared to the electrolytes according to Example 1 and Example 2, which included additives such as 1, 3-propane sultone and vinylene carbonate or 1, 3-propane sultone as an additive. It can also be seen that the mirroring speed of Comparative example 2 is relatively slow as compared to the electrolyte according to Comparative example 1 which does not use the ionic liquid. In addition, haze occurred in Comparative example 2.

In the case of the electrolyte according to Example 2 in which NBMPBr was used as the halogenated ionic liquid and 1,3-propane sultone was used as an additive, it can be seen that both the transparency speed and the mirroring speed are fast as compared to the electrolyte according to Comparative example 2 which only uses NBMPBr as an ionic liquid but does not use an additive.

In the case of the electrolyte according to Example 1 in which NBMPBr was used as the halogenated ionic liquid, and vinylene carbonate and 1,3-propane sultone were used as additives, it can be seen that both the mirroring speed and transparency speed are fast as compared to the electrolyte according to Example 2 which uses NBMPBr as the halogenated ionic liquid and 1,3-propane sultone additive as an additive.

Specifically, it was confirmed that the electrolyte of Example 1 had an average of 29 seconds of mirroring time and an average of 10 seconds of transparency time. As a result, it can be seen that the mirroring speed was improved by about 1.5 times and the transparency speed was about 13 times higher than that of the electrolyte according to Comparative example 1.

Figure 7:
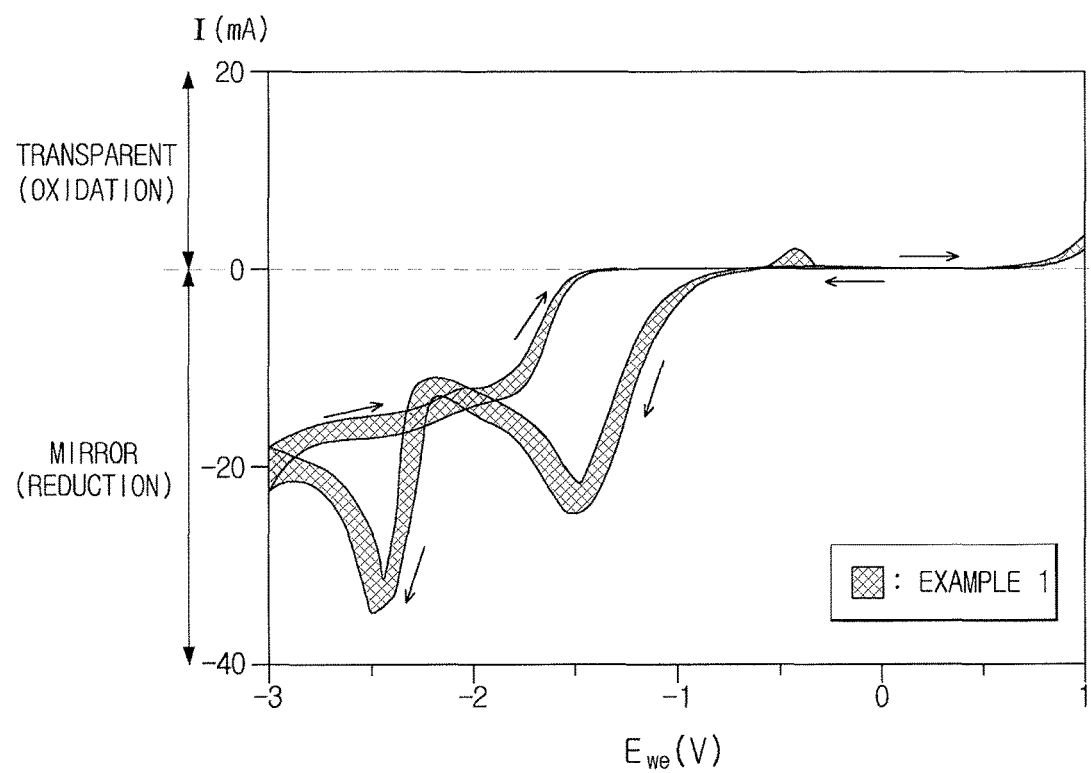
FIGS. 7 and 8 are graphs showing a CV (cyclic voltammogram) curve measuring the electrochemical oxidation-reduction behavior of an electrolyte.
Figure 8:
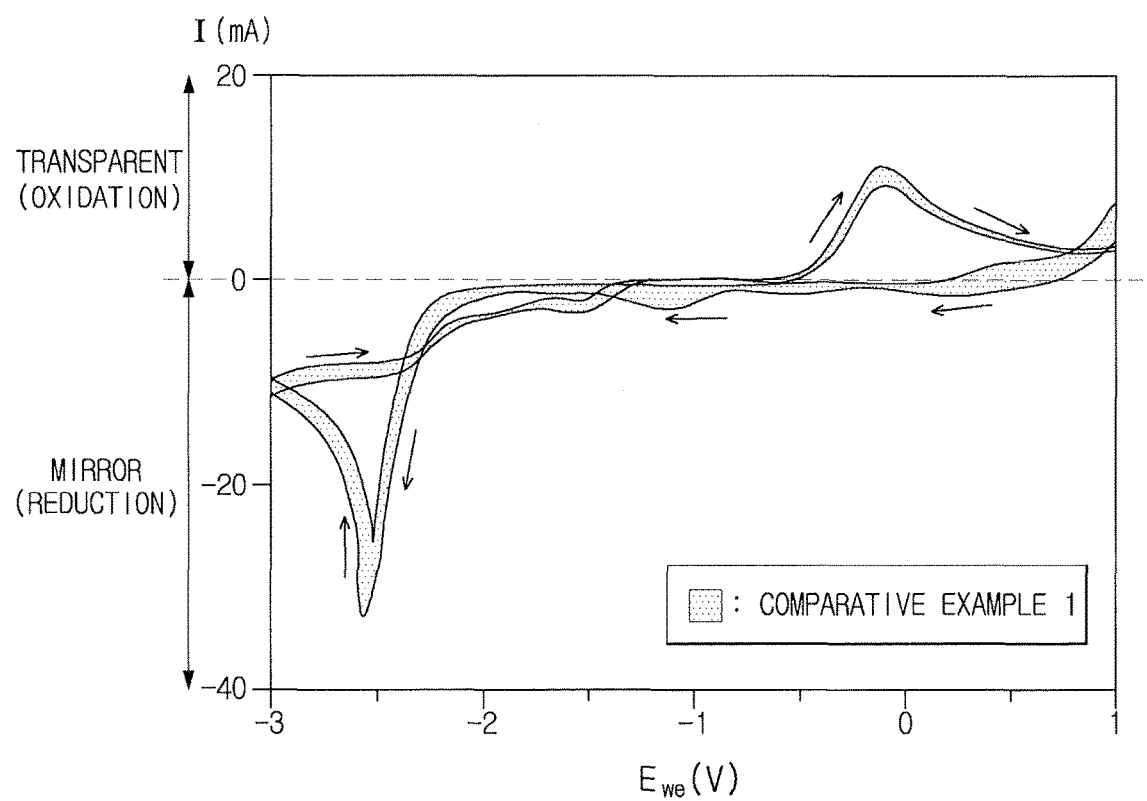

FIGS. 7 and 8 are graphs showing CV (cyclic voltammogram) curves obtained by measuring the electrochemical oxidation-reduction behavior of an electrolyte. More specifically, FIG. 7 shows the CV curve of an electrolyte according to Example 1, and FIG. 8 shows the CV curve of an electrolyte according to Comparative example 1.

FIGS. 7 and 8 show the electrochemical redox behavior of the electrolyte according to Example 1 and Comparative example 1 at 20 mV/sec, −3 V to 1 V, and 100 cycles.

Referring to the CV curve of Example 1 shown in FIG. 7, it can be seen that the first peak occurs at about −1.5V in the reduction region, and the second peak occurs at about −2.5V in the region thereafter. Next, it was confirmed that no peak occurred in the 0V oxidation region.

On the other hand, when the CV curve of Comparative example 1 shown in FIG. 8 is examined, it can be seen that there is no reduction peak in the reduction range from about −0.8V to −1.8V and the first peak occurs at −2.6V in the reduction range. Next, it was confirmed that a second peak occurred in the oxidation region of 0V.

Experimental results show that, in the case of the electrolyte according to Example 1 using 1,3-propane sultone and vinylene carbonate additives according to the present disclosure, it was confirmed that the first peak occurred at −1.5V in the reduction range, unlike the case of the electrolyte according to Comparative example 1 which does not use an additive according to the present disclosure. From this, it can be deduced that the peak occurring at −1.5 V in the reduction region is due to the 1,3-propane sultone additive and the vinylene carbonate additive.

Next, in the case of the electrolyte according to Example 1, it can be seen that a peak similar to the peak for Comparative example 1 was generated at −2.2 V to −3 V in the reduction region. From this, it can be seen that the peak occurring at −2.2 V to −3 V in the reduction regions reflects the mirroring reduction behavior in which nucleation and growth of silver (Ag) occurs.

From the CV results, it can be deduced that a 1,3-propane sultone additive and a vinylene carbonate additive act as a catalyst for inducing rapid mirroring in the process of reducing silver ions ($Ag^+$) to silver metal particles (Ag).

Figure 9:
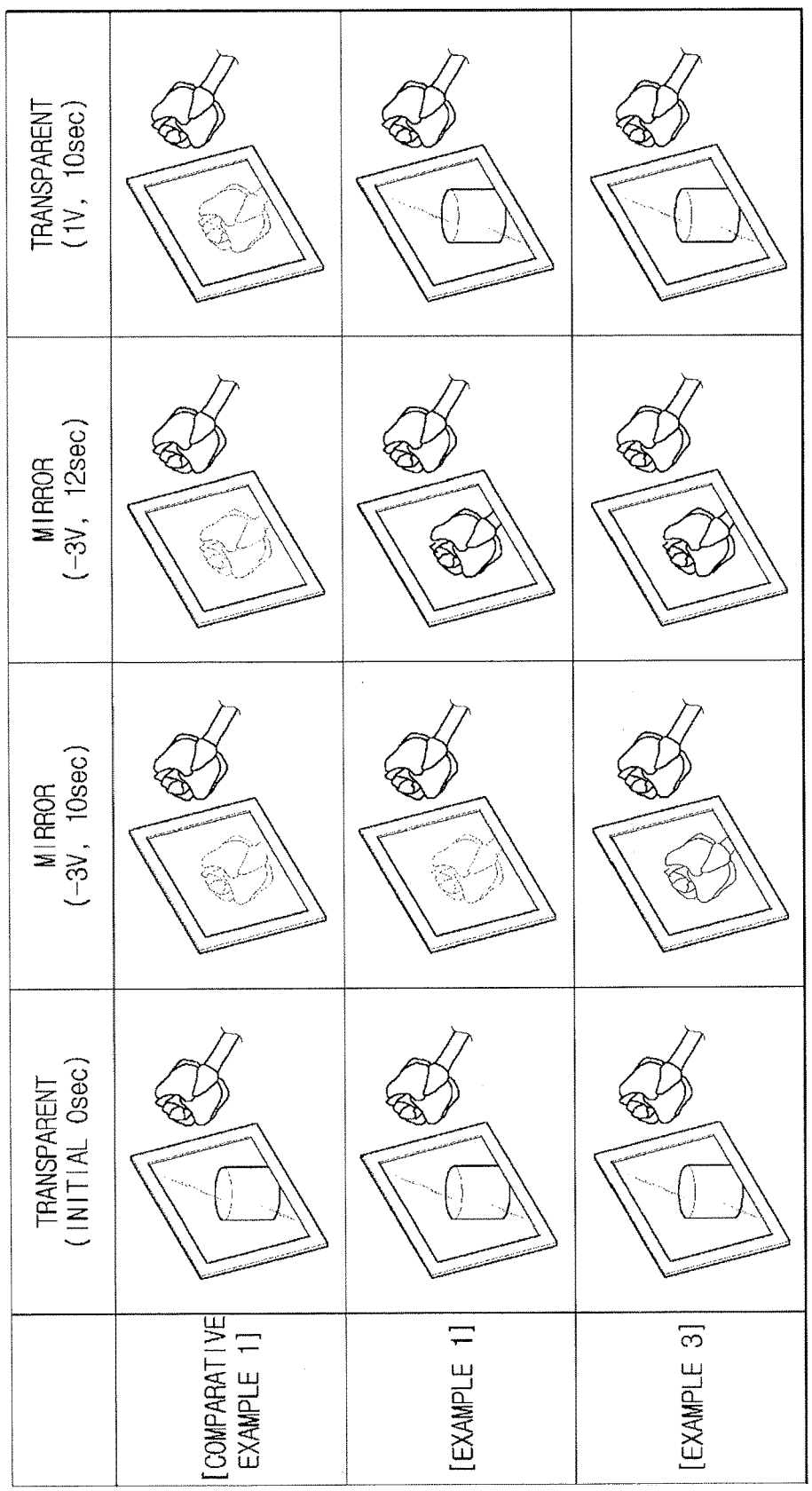
FIG. 9 is a figure illustrating the switching speed and durability of the electrolytes of Comparative Example 1, Example 1, and Example 3.

FIG. 9 is a figure showing the results of monitoring the switching speed and durability of a transparent electrode for each electrolyte in real time.

Specifically, FIG. 9 shows the results of monitoring the switching speed and durability of the electrolyte according to Example 1, Example 3 and Comparative example 1. The figure shows the mirror/transparent state of each electrolyte over time from the initial stage of applying a reduction voltage (−3V) to the transparency stage of applying oxidation voltage (+1V) after mirroring.

In the case of the electrolyte according to Comparative example 1 which does not include an ionic liquid and an additive (e.g., VC or PS), a side reaction in which a black metal layer is formed on the surface in the mirroring step after 100 cycles occurs. Meanwhile, in the case of the electrolytes of Example 1 and Example 3, it can be seen that the object located in front of the mirror layer is mirrored quickly, and the short-term durability and the rapid transparency speed are shown.

Also, although it is not shown, the switching speed of the electrochemical mirror in a state where a black object is placed in the background is faster than the conventional switching time required until the object placed on the back of the mirror disappears, in terms of visibility, and occurs within about 5 seconds. Also, it can be seen that electrolytes having characteristics such as being able to maintain memory for about 1 minute without exhibiting cracks or wrinkles in the mirror in OCV (open-circuit-voltage) can be obtained.

Figure 10:
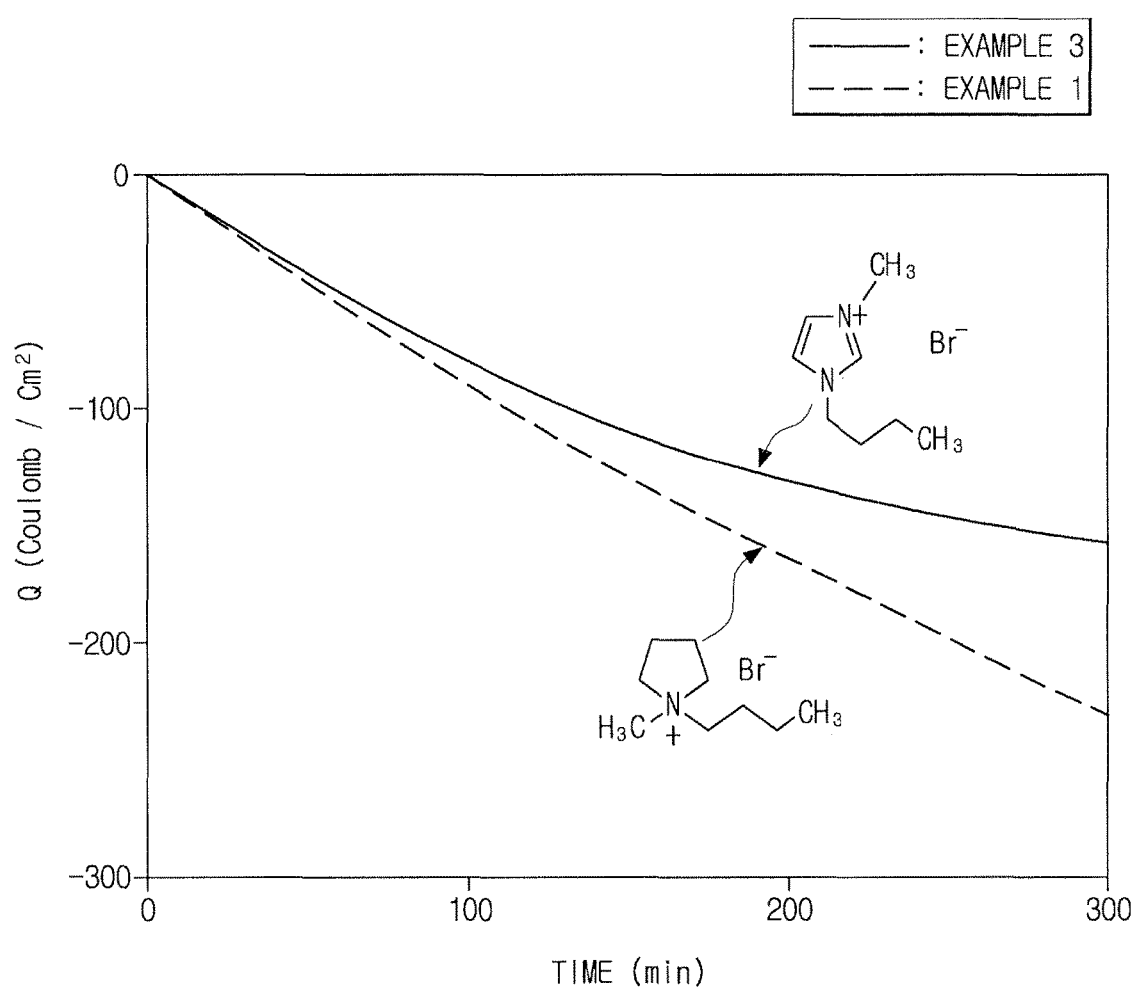
FIG. 10 is a graph showing the results of a long-term durability test of a transparent electrode.

FIG. 10 is a graph showing the results of a long-term endurance test of a transparent electrode.

In this experiment, the increase in the charge density (Q, coulomb/$cm^2$) over time was measured to determine the stable driving state of the transparent electrode when the mirroring state was maintained for a long period of time under the reduction voltage (−3V) state. In FIG. 10, the more uniform the slope of the graph, the more uniform the mirroring and the less cracking occurs.

Referring to FIG. 10, it can be seen that the electrolyte according to Example 3 using imidazolium-based ionic liquids had excellent durability within a limited time range. Here, a limited time range means the interval in which the graph has a constant slope. Indeed, imidazolium-based ionic liquids tend to be more stable as the length of the sidechain attached to the ring structure increases.

As is apparent from the above description, according to the proposed electrochemical mirror, it may be possible to provide an electrochemical mirror having excellent electrochemical stability by including only a halogenated ionic liquid, for example, a pyrrolidinium bromide ionic liquid in an electrolyte.

In addition, it may be possible to provide an electrochemical mirror that reduces the internal resistance of cells and enables reflection and transparent switching in a short period of time using a sulfonate compound as an additive in the electrolyte.

In addition, it may be possible to provide an electrochemical mirror that possesses stable memory characteristics without cracking, wrinkling or peel-off of the electrochemical mirror layer even when the power is turned off.

Further, it can be seen that the electrolyte according to Example 1 using pyrrolidinium-based ionic liquids also exhibits a stable charge density without wrinkling, cracking and forming an irreversible dead metal layer even in harsh environments where long-time mirroring is maintained.

The example embodiments have been described with reference to the accompanying drawings. It should be understood by those skilled in the art that the present disclosure is not limited to the above-described example embodiments, and may be modified and changed without departing from the scope and spirit of the present disclosure.

What is claimed is:
1. An electrochemical mirror comprising:
   a first transparent electrode;

a second transparent electrode spaced apart from the first transparent electrode; and
an electrolyte layer comprising an electrolyte, and disposed between the first transparent electrode and the second transparent electrode, wherein the electrolyte comprises:
an electro-depositable metal ion;
a halogenated ionic liquid; and
at least one additive selected from the group consisting of a compound having a sulfonate functional group and derivatives thereof.

2. The electrochemical mirror according to claim 1, wherein the halogenated ionic liquid comprises at least one halogenated ionic liquid selected from the group consisting of a pyrrolidinium-based ionic liquid, a pyridinium-based ionic liquid, a piperidinium-based ionic liquid and an imidazolium-based ionic liquid.

3. The electrochemical mirror according to claim 1, further comprising a carbonate additive.

4. The electrochemical mirror according to claim 3, wherein the carbonate additive comprises at least one selected from the group consisting of a vinylene carbonate (VC), a vinylethylene carbonate (VEC), a fluoro-ethylene carbonate (FEC) and a carbonate additive in which at least one hydrogen atom contained in the carbonate additive is substituted with a fluorine substituent.

5. The electrochemical mirror according to claim 1, wherein the compound having the sulfonate functional group has at least one of a cyclic form and a linear form.

6. The electrochemical mirror according to claim 5, wherein the compound having the sulfonate functional group has the cyclic form and is represented by the following constitutional formula 1:

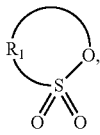

[Constitutional formula 1]

wherein, in the constitutional formula 1, the $R_1$ group is hydrogen, an alkyl group having 1 to 10 carbon atoms, an alkene group, or an alkyne group.

7. The electrochemical mirror according to claim 6, wherein one of hydrogen atoms contained in the alkyl group, the alkene group or the alkyne group is substituted with the sulfonate functional group.

8. The electrochemical mirror according to claim 6, wherein the constitutional formula 1 contains at least one of the $R_1$ group.

9. The electrochemical mirror according to claim 6, wherein the constitutional formula 1 comprises an ether group in at least one ring of the constitutional formula 1 or the $R_1$ group.

10. The electrochemical mirror according to claim 5, wherein the compound having the sulfonate functional group has the linear form and is represented by the following constitutional formula 2:

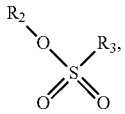

[Constitutional formula 2]

wherein, in the constitutional formula 2, the $R_2$ and $R_3$ groups are hydrogen, an alkyl group of 1 to 10 carbon atoms, an alkene group or an alkyne group.

11. The electrochemical mirror according to claim 1, wherein the compound having the sulfonate functional group includes a multiple bond between carbon molecules in the compound.

12. The electrochemical mirror according to claim 1, wherein the electro-depositable metal ion comprises at least one selected from the group consisting of silver (Ag), gold (Au), magnesium (Mg), nickel (Ni), bismuth (Bi), chromium (Cr), aluminum (Al), copper (Cu) and calcium (Ca).

13. The electrochemical mirror according to claim 1, wherein, when a voltage is applied to the first and second transparent electrodes, the electro-depositable metal ion is reduced to form an electrochemical mirror layer on a surface of one of the first and second transparent electrodes.

14. The electrochemical mirror according to claim 1, wherein the electrolyte comprises at least one selected from the group consisting of tetra-n-butylammonium bromide (TBABr), tetraethylammonium bromide (TEABr), a halogenated material containing a halogenated anion and forming an ionic salt with the halogenated anion, lithium bromide (LiBr) and tetra-n-butylammonium perchlorate (TBAP).

15. The electrochemical mirror according to claim 1, wherein the electrolyte comprises at least one selected from the group consisting of water, dimethyl sulfoxide (DMSO), N-methyl-2-pyrrolidone (NMP), acetonitrile (AN), ethylene glycol (EG), gamma-butyrolactone (GBL), dimethyl formamide (DMF), glyme-based solvents, ether-based solvents, linear or cyclic carbonate-based solvents and mixtures thereof.

16. The electrochemical mirror according to claim 1, wherein the electrolyte further comprises a polymer that improves viscosity and stability of the electrolyte, and
wherein the polymer comprises at least one selected from the group consisting of polyvinyl butyral (PVB), cyano resin, polyvinylidene fluoride (PVDF), polyvinylidene-hexafluoropropylene (PVDF-HFP) and mixtures thereof.

17. The electrochemical mirror according to claim 1, wherein each of the first and second transparent electrodes are disposed on at least one substrate selected from the group consisting of a glass substrate, a rigid substrate, a polyethylene terephthalate (PET) substrate, and a flexible substrate.

18. An electrochemical mirror comprising:
a first transparent electrode;
a second transparent electrode spaced apart from the first transparent electrode; and
an electrolyte layer comprising an electrolyte, and disposed between the first transparent electrode and the second transparent electrode, wherein the electrolyte comprises:
electro-depositable metal ions selected from the group consisting of copper (Cu), calcium (Ca) and strontium (Sr), and electro-depositable metal ions selected from the group consisting of silver (Ag), gold (Au), magnesium (Mg), nickel (Ni), bismuth (Bi), chromium (Cr) and aluminum (Al); and
a halogenated ionic liquid.

19. The electrochemical mirror according to claim 18, wherein the halogenated ionic liquid comprises at least one halogenated ionic liquid selected from the group consisting of a pyrrolidinium-based ionic liquid, a pyridinium-based ionic liquid, a piperidinium-based ionic liquid and an imidazolium-based ionic liquid.

20. The electrochemical mirror according to claim 19, wherein the electrolyte comprises at least one selected from the group consisting of tetra-n-butylammonium bromide (TBABr), tetraethylammonium bromide (TEABr), a halogenated material containing a halogenated anion and forming an ionic salt with the halogenated anion, lithium bromide (LiBr) and tetra-n-butylammonium perchlorate (TBAP).

* * * * *